(12) United States Patent
He et al.

(10) Patent No.: US 6,963,472 B2
(45) Date of Patent: Nov. 8, 2005

(54) FLEXURAL PIVOT FOR ROTARY DISC DRIVE ACTUATOR

(75) Inventors: Zhimin He, Singapore (SG); Guoxiao Guo, Singapore (SG); Hua Qian, Singapore (SG); EngHong Ong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 713 days.

(21) Appl. No.: 09/894,480

(22) Filed: Jun. 27, 2001

(65) Prior Publication Data

US 2002/0024771 A1 Feb. 28, 2002

Related U.S. Application Data

(60) Provisional application No. 60/229,569, filed on Aug. 30, 2000, provisional application No. 60/250,647, filed on Dec. 1, 2000.

(51) Int. Cl.[7] .............................................. G11B 5/55
(52) U.S. Cl. .................................................. 360/265.7
(58) Field of Search ........................ 360/265.7, 265.2, 360/265.6, 264.3

(56) References Cited

U.S. PATENT DOCUMENTS

| | | | | |
|---|---|---|---|---|
| 3,360,255 A | * | 12/1967 | Ormond | 267/154 |
| 3,909,077 A | * | 9/1975 | Leonarduzzi | 403/291 |
| 4,405,184 A | * | 9/1983 | Bahiman | 403/291 |
| 4,478,532 A | * | 10/1984 | Puro | 403/157 |
| 4,745,504 A | | 5/1988 | Foote | 360/106 |
| 4,751,596 A | * | 6/1988 | Rohart | 360/256.3 |
| 4,812,072 A | * | 3/1989 | Brooks | 403/24 |
| 4,997,123 A | | 3/1991 | Backus et al. | 228/182 |
| 5,050,964 A | * | 9/1991 | Mori | 359/813 |
| 5,202,804 A | * | 4/1993 | Takekado | 360/264.7 |
| 5,267,110 A | * | 11/1993 | Ottesen et al. | 360/265 |
| 5,313,355 A | | 5/1994 | Hagen | 360/244.5 |
| 5,408,374 A | | 4/1995 | Morehouse et al. | 360/99.08 |
| 5,432,663 A | * | 7/1995 | Ichihara | 360/264.7 |
| 5,504,641 A | | 4/1996 | Diel | 360/106 |
| 5,559,652 A | | 9/1996 | Heath et al. | 360/106 |
| 5,612,842 A | | 3/1997 | Hickox et al. | 360/266.4 |
| 5,620,169 A | * | 4/1997 | Payne | 267/160 |
| 5,675,452 A | * | 10/1997 | Nigam | 360/97.02 |
| 5,680,276 A | | 10/1997 | Takekado | 360/106 |
| 5,757,588 A | * | 5/1998 | Larson | 360/265.2 |
| 5,761,006 A | | 6/1998 | Sri-Jayantha et al. | 360/106 |
| 5,872,688 A | | 2/1999 | Battu et al. | 360/264.7 |
| 6,205,005 B1 | * | 3/2001 | Heath | 360/266.1 |

(Continued)

*Primary Examiner*—Angel Castro
(74) *Attorney, Agent, or Firm*—Derek J. Berger

(57) ABSTRACT

The present invention provides for a flexural pivot that can be fitted within a cavity of an actuator. The pivot includes a first member that can be coupled to the wall defining the cavity and a second member that can be mounted to the disc drive housing component of the disc drive. At least two leaves join external surfaces of the first member to the second member.

The present invention offers a flexural pivot that can be easily incorporated with rotary actuators traditionally designed for use with a ball bearing pivot cartridge. In addition, it avoids the difficulties encountered by conventional designs when trying to assemble intersecting flat springs within a cylindrical sleeve. Furthermore, in comparison with conventional flexural pivots that are located outside the actuator body, the present invention provides a compact pivot that can be mounted substantially in a cavity of the actuator body such that the center of rotation of the actuator is located nearer the center of mass.

18 Claims, 5 Drawing Sheets

U.S. PATENT DOCUMENTS 6,404,727 B1 * 6/2002 Rao ........................... 369/244
6,424,503 B1 * 7/2002 Chin et al. ............... 360/265.2
6,442,000 B1 * 8/2002 Koong et al. ............ 360/256.4
2001/0012181 A1   8/2001 Inoue et al. ............. 360/244.5

* cited by examiner

FLEXURAL PIVOT FOR ROTARY DISC DRIVE ACTUATOR

RELATED APPLICATION

This application claims the benefit of U.S. Provisional Application No. 60/229,569, filed Aug. 30, 2000, and U.S. Provisional Application No. 60/250,647, filed Dec. 1, 2000.

FIELD OF THE INVENTION

The present invention relates generally to disc drives. More particularly, the present invention relates to pivots for use with disc drive actuators.

BACKGROUND OF THE INVENTION

A typical magnetic disc drive includes one or more read/write heads for reading data from or writing data to one or more discs mounted on a spindle motor. The data is stored in generally concentric tracks on the disc surfaces. During drive operations, the read/write heads are positioned at selected radial locations while the discs are rotated by the spindle motor. Rotary actuators are often employed to carry the read/write heads to the desired locations. The actuator is coupled to a voice coil motor which provides the torque for rotating the actuator about its pivot. Ball bearing pivots are typically chosen for their compactness. However, ball bearings operate with some degree of pre-load and friction, which can lead to non-linearity in the movement of the actuator.

Flexural pivots appear to offer a feasible alternative to ball bearing pivots in that there is no stiction and that the resolution of positioning can be essentially a function of the servo control system. Attempts have been made in the past to incorporate flexural pivots into disc drives, such as the pivot systems described in the U.S. Pat. No. 5,504,641, issued to Diel on Apr. 2, 1996, and the U.S. Pat. No. 5,029,030, issued to Luecke on Jul. 2, 1991. However, these designs include large, unwieldy springs which are unsuitable in modern disc drives where size is an important consideration.

General purpose flexural pivots have also been designed, such as those of the type described in U.S. Pat. No. 3,811,665, issued to Seelig on May 21, 1974. In such flexural pivots, two flat springs are assembled so that a solid center of one spring is disposed within an open center of the other spring. The springs are coupled at their longitudinal edges to undercut slots inside a circular sleeve. Such flexural pivots can be difficult to assemble, however, and no pivots of this type have been successfully incorporated into disc drives. There remains therefore a need for an improved flexural pivot for use with a rotary actuator, one which eliminates the problems associated with conventional ball bearing cartridges while being suitable for use in modern disc drives.

SUMMARY OF THE INVENTION

The present invention relates to flexural pivots for use with rotary disc drive actuators. According to a preferred embodiment, the pivot can be substantially disposed in a cavity of the actuator. The pivot includes a first member that is coupled to the cavity wall and a second member that is mounted to a disc drive housing component of the disc drive. At least two leaves join the first member to the second member. Each of the leaves extend from at least one external surface of the member. The leaves are transversely disposed relative to one another.

In one embodiment, the cavity is configured with two end walls that define a recess in slidable engagement with the second member. The two end walls serve to limit the rotation of the actuator by coming into abutment with the second member. In another embodiment, the cavity further includes a first recess shaped to locate the first member. Preferably, two washers are secured to each leaf such that the two washers are spaced apart by a same distance for all the leaves. According to a preferred embodiment, the center of rotation of the pivot is generally coincidental with the center of mass of the actuator.

These and various other features as well as advantages which characterize the present invention will be apparent upon reading of the following detailed description and review of the associated drawings.

DETAILED DESCRIPTION

Figure 1:
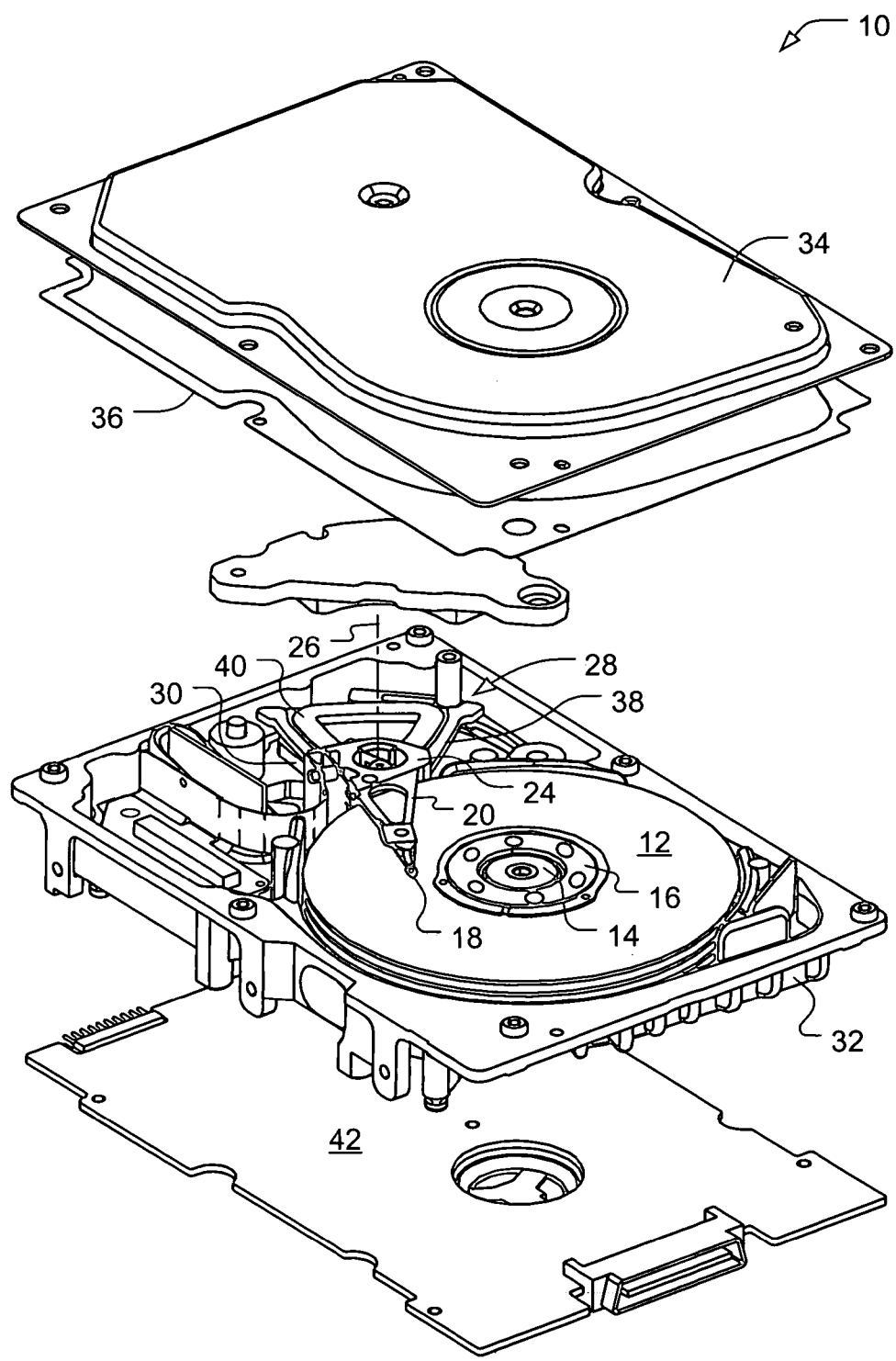
FIG. 1 is a perspective view of a disc drive in which one embodiment of the present invention is implemented.

Referring now to FIG. 1, there is illustrated a disc drive (10) with a number of discs (12) secured to a spindle (14) by a disc clamp (16). The discs (12) are formatted for storing data in circular tracks. Read/write heads (18), supported at the tip of each actuator arm (20), are provided to read and record data to the discs (12). The actuator arms (20) extend transversely from an actuator body (22) of an actuator (24) that is configured for rotational movement about an axis (26) such that the read/write heads (18) can be positioned at the desired radial location and can thus read/write to the selected track.

The actuator (24) is coupled to a voice coil motor (28) which includes a magnet (30) secured to a disc drive housing. The housing of the disc drive shown in FIG. 1 has a base (32) and a cover (34) which when in assembly with a gasket (36) provide a sealed environment for the various disc drive components mounted therein. The present invention, however, is not limited to disc drives of such configurations and can be applied to disc drives with other housing structures.

From the actuator body (22), support arms (38) extend to hold a coil (40) adjacent to the magnet (30). The support arms (38) are disposed diametrically opposite the actuator arms (20), to provide a center of mass at the actuator body. When the coil (40) is energized, resultant torque acting on the actuator causes the actuator (24) to rotate relative to the base (32) of the disc drive. Disc drive control circuitry, most of which is embodied in a printed circuit board assembly (42) mounted to the base (32), controls the current provided to the coil (40), and thus controls the direction and degree of rotation of the actuator (24).

Figure 2:
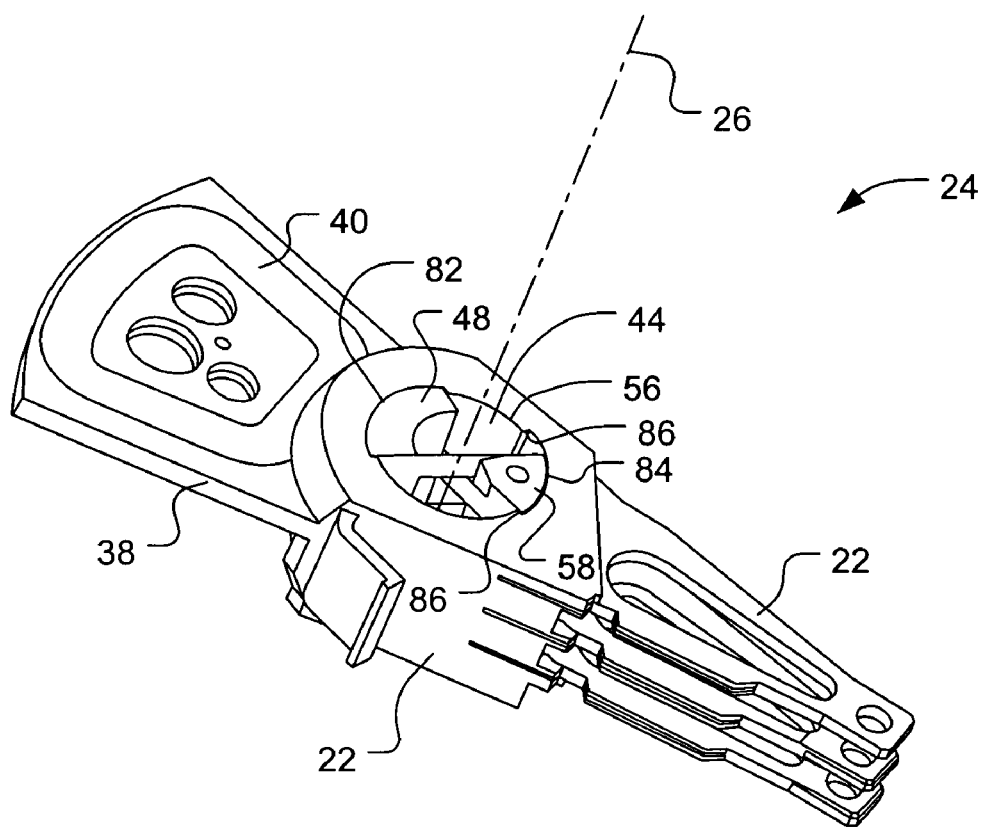
FIG. 2 is a perspective view of an actuator according to a preferred embodiment of the present invention.
Figure 3:
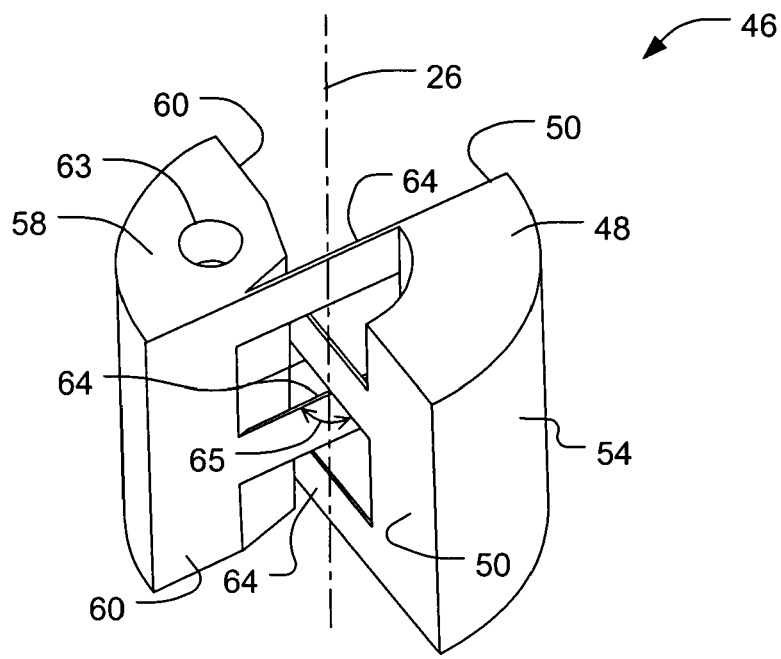
FIG. 3 is a perspective view of the flexural pivot of FIG. 2.

The actuator body (22) is provided with a cavity (44) extending along the axis of rotation (26). According to an embodiment of the present invention, there is provided a flexural pivot (46) inside the cavity (44) to enable rotation of the actuator (24) in a transverse plane, as is illustrated in FIG. 2. A preferred embodiment of the pivot (46) is shown in greater detail in FIG. 3. The pivot (46) includes a first member (48) with two external inclined surfaces (50) inclined towards a virtual center of rotation of the pivot. The inclined surfaces (50) are separated by a third surface (54) that is configured to abut the wall (56) defining the cavity (44). The first member (48) is secured to the actuator body (22) by a transversely located set screw threadably engaged to the actuator body (22) and the first member (48).

The pivot (46) further includes a second member (58) also having two external inclined surfaces (60) inclined towards the center of rotation of the pivot. These inclined surfaces (60) need not have the same angle of separation as the inclined surfaces (50) of the first member. The second member (58) is configured with mounting features (62) for mounting to the base (32) or to the cover (34) of the disc drive. For example, the second member (58) can be secured by the use of a set screw that engages an axial tapped hole (63) in the second member and a similarly tapped hole in the base (32) or the cover (34) of the disc drive. Alternatively, the second member (58) can also be secured to both the base (32) and the cover (34) of the disc drive.

The pivot (46) includes a plurality of leaves (64) joining the first member (48) and the second member (58). Each leaf (64) begins from one of the inclined surfaces (50) of the first member, traversing the center of rotation, and ending at one of the inclined surfaces (60) of the second member. Adjacent leaves begin from alternate inclined surfaces of the first member to end at alternate inclined surfaces of the second member. The center of rotation of the pivot is generally at the point where the leaves (64) intersect, which is preferably designed to be near to, or to coincide with, the center of mass of the actuator. The angle of separation 65 of the adjacent leaves, in the relaxed state of the pivot, may be varied in different embodiments to obtain a different torsional stiffness.

According to one embodiment of the present invention, the pivot (46) is formed as a monolithic unit by electrical discharge machining of a solid piece of metal.

Figure 4:
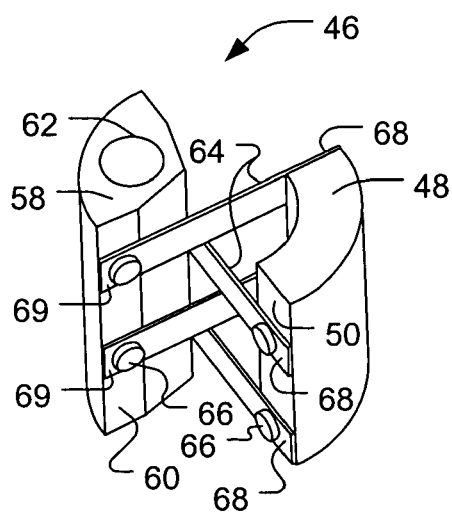
FIG. 4 is a perspective view of an alternative embodiment of the flexural pivot.
Figure 5:
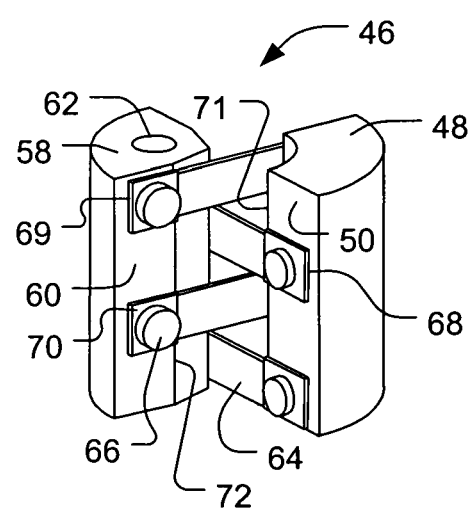
FIG. 5 shows the flexural pivot of FIG. 4 incorporating the use of washers.

According to another embodiment as shown in FIG. 4, the leaves (64) are separate thin flat strips of steel which are coupled by fasteners (66) to the first member (48) and second member (58) at their respective ends (68, 69). Fasteners such as screws can be used. Preferably, rectangular washers (70) are inserted between the leaves (64) and the fasteners (66) so that the flexure lengths of the leaves are more or less the same, being kept to the distance between the edges (71, 72) of the respective inclined surfaces (50, 60). One example of this is illustrated in FIG. 5.

Figure 6:
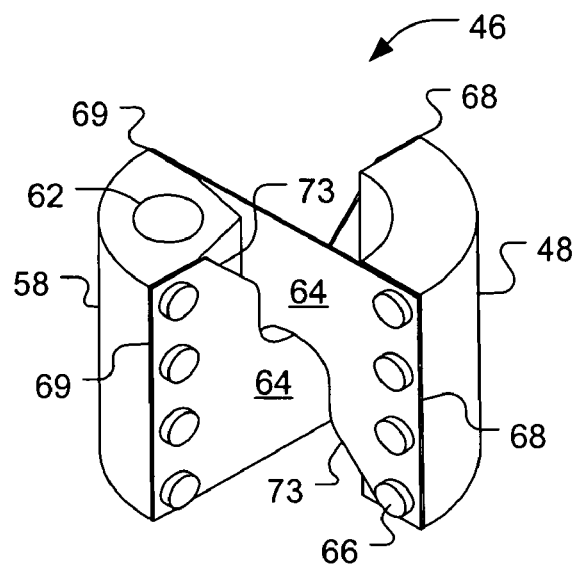
FIG. 6 is a perspective view of an embodiment having two leaves.

Referring to FIG. 6 for an alternative embodiment, the leaves 64 may include a flange (73) at both ends (68, 69) for attachment to the whole length of the respective inclined surface (50, 60).

Figure 7:
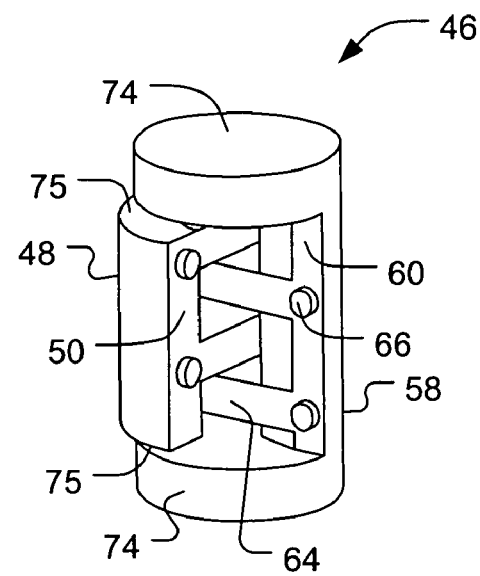
FIG. 7 is a perspective view of an alternative embodiment with endplates.
Figure 8:
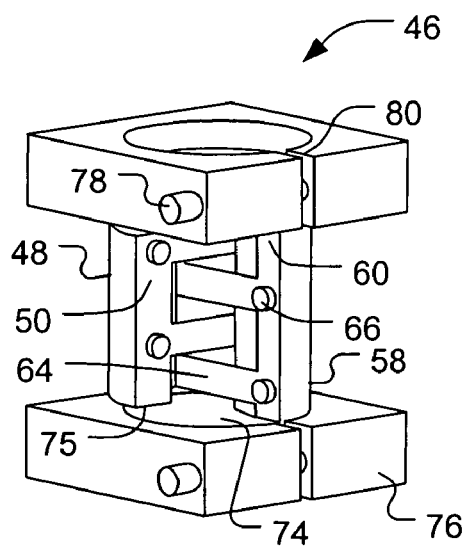
FIG. 8 shows the flexural pivot of FIG. 7 in assembly with clamps.

In yet another embodiment which is shown in FIG. 7, the pivot (46) includes endplates (74) transversely disposed at both ends of the second member (58). The endplates (74) allow for abutment against the base (32) and the cover (34) of the disc drive and can thus be adapted for mounting to the disc drive housing components by fasteners or adhesives. Clearance is provided between the endplates and the ends (75) of the first member so as not to hinder the movement of the first member. Clamps (76) can be added, if so desired, to facilitate mounting to the respective disc drive housing component (32, 34). In the example shown in FIG. 8, a screw (78) is used to close the gap (80) between the ends of the clamp, and thereby secures the clamp to the endplates.

Referring back to FIG. 2, the cavity preferably includes a first recess (82) for locating the first member (48). A second recess (84) may also be provided such that end walls (86) of the second recess act as limit stops when the second member (58) comes into abutment with the respective end walls (86) in the course of its rotation.

Figure 9:
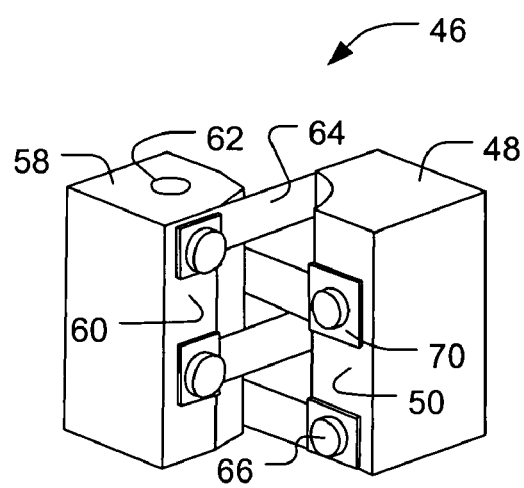
FIG. 9 illustrates alternative shapes for the first member and second member of a flexural pivot according to the present invention.

The first member 48 and the second member 58 need not have arcuate cross-sections to complement the shape of the cavity 44. Different shapes may be chosen, and possible alternative shapes are illustrated in FIG. 9 for exemplary purposes only.

Figure 10:
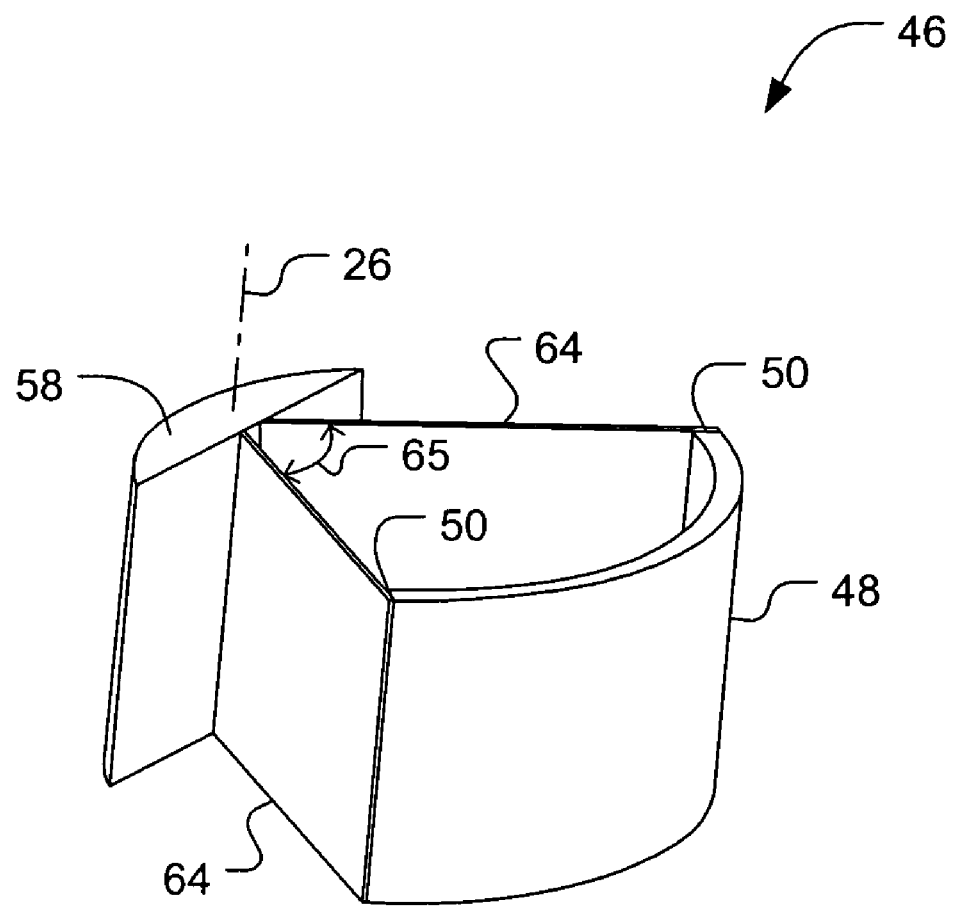
FIG. 10 is a perspective view of a flexural pivot according to an alternative embodiment of the present invention.

Referring to FIG. 10, another embodiment of the present invention is shown. A pivot (46) of this embodiment can be easily fitted within the cavity (44) of the actuator (24) with the first member (48) attached to the wall (56) of the cavity. The second member (58) can be similarly provided with features (not shown) for mounting to the housing component (such as 32). Two leaves (64) extending from the second member (58) are attached to external surfaces (50) of the first member. When the pivot (46) is in its relaxed state, as shown, the two leaves (64) are at an angle (65) to one another. Otherwise, the leaves (64) bend so that the first member is rotated relative to a center of rotation represented by an axis (26).

Disclosed is a flexural pivot that can be easily incorporated with rotary actuators traditionally designed for use with a ball bearing pivot cartridge. In addition, it avoids the difficulties encountered by conventional designs when trying to assemble intersecting flat springs within a cylindrical sleeve. Furthermore, in comparison with conventional flexural pivots that are located outside the actuator body, the present invention provides a compact pivot that can be mounted substantially in a cavity of the actuator body such that the center of rotation of the actuator is located nearer the center of mass.

Alternatively, embodiments of the present invention may be described as follows:

In a first contemplated embodiment, a pivot (such as 46) can be substantially disposed in a cavity (44) that is defined by a wall (56) of an actuator (24). The pivot (46) includes a first member (48) that is coupled to the wall (56) and a second member (58) that has mounting features (such as 62, 63) for mounting to a disc drive housing component (such as 32, 34) of the disc drive (10). The first member (48) has at least one first external surface (50). The pivot includes at least two leaves (64) transversely disposed at an angle (65) to one another, where each of the leaf (64) joins one of the first external surfaces (50) to the second member (58) such that the actuator (24) is pivotable with respect to the disc drive housing component (such as 32, 34) about an axis (26).

In another contemplated embodiment, the cavity (44) is configured with two end walls (86) that define a recess (84) in slidable engagement with the second member (58). The two end walls (86) serve to limit the rotation of the actuator (24) by coming into abutment with the second member (58). In another embodiment, the cavity (44) further includes a first recess (82) shaped to locate the first member (48).

Preferably, two washers (70) are secured to each leaf (64) such that the two washers (70) are spaced apart by a same distance for all the leaves (64). According to a preferred embodiment, the center of rotation of the pivot (46) is generally coincidental with the center of mass of the actuator (24). Preferably, each of the first external surfaces (50) is inclined towards the center of rotation. In an alternative embodiment, the second member (58) may include second mounting features (62) for mounting to a second disc drive housing component (such as 32, 34).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts without departing from the scope and spirit of the present invention.

What is claimed is:

1. A disc drive comprising:
    a housing having a first component;
    an actuator having a cavity; and
    a pivot comprising:
        a first member positioned within the cavity and coupled to the actuator, the first member having at least one external surface;
        a second member mounted to the first housing component; and
        at least two leaves, each leaf joining one of the external surfaces to the second member, wherein the leaves are transversely disposed at an angle to one another such that the actuator is pivotable with respect to the housing about an axis.

2. The disc drive of claim 1 in which the cavity further comprises:
    two end walls defining a recess in slidable engagement with the second member, the two end walls serving to limit rotation of the actuator by coming into abutment with the second member.

3. The disc drive of claim 1 in which the cavity further comprises:
    a first recess shaped to locate the first member.

4. The disc drive of claim 1 further comprising:
    a pair of washers secured to each one of the leaves, the washers of each pair being spaced apart by substantially a same distance.

5. The disc drive of claim 1 in which the pivot has a center of rotation generally coincident with a center of mass of the actuator.

6. The disc drive of claim 5 in which each of the external surfaces is inclined towards the center of rotation.

7. The disc drive of claim 1, the housing further comprising:
    a second component, the second member being coupled to the second housing component.

8. An actuator configured for rotational movement about an axis, comprising:
    an actuator body having a cavity; and
    a pivot comprising:
        a first member positioned within the cavity and coupled to the actuator;
        a second member positioned within the cavity and configured to be mounted to a housing; and
        at least two leaves, each leaf joining the first member to the second member, wherein the leaves are transversely disposed at an angle to one another such that the actuator is configured to be pivotable with respect to the housing about the axis.

9. The actuator of claim 8 in which the cavity further comprises:
    two end walls defining a recess in slidable engagement with the second member, the two end walls serving to limit rotation of the actuator by coming into abutment with the second member.

10. The actuator of claim 8 in which the cavity further comprises:
    a first recess shaped to locate the first member.

11. The actuator of claim 8 further comprising:
    two washers secured to each one of the leaves, the two washers being spaced apart by a same distance for all the leaves.

12. The actuator of claim 8 in which the pivot includes a center of rotation generally coincident with a center of mass of the actuator.

13. The actuator of claim 12 in which each of the external surfaces is inclined towards the center of rotation.

14. The actuator of claim 8 in which the second member is configured to be mounted to first and second housing components.

15. A disc drive comprising:
    a base;
    an actuator configured for rotation relative to the base about an axis of rotation; and
    means for pivotably coupling the actuator to the base.

16. The disc drive of claim 15, in which the coupling means includes a center of rotation generally coincidental with a center of mass of the actuator.

17. The disc drive of claim 15 in which the coupling means comprises:
    a mounting element fixed to the base.

18. The disc drive of claim 15 in which the coupling means comprises:
    a mounting element fixed to the actuator within the cavity.

* * * * *